(12) United States Patent
Turner

(10) Patent No.: US 11,326,358 B2
(45) Date of Patent: May 10, 2022

(54) HARDBOARD INSTALLATION SUPPORT APPARATUS

(71) Applicant: Jason Turner, Cumberland (CA)

(72) Inventor: Jason Turner, Cumberland (CA)

( * ) Notice: Subject to any disclaimer, the term of this patent is extended or adjusted under 35 U.S.C. 154(b) by 17 days.

(21) Appl. No.: 16/997,644

(22) Filed: Aug. 19, 2020

(65) Prior Publication Data

US 2022/0056710 A1    Feb. 24, 2022

(51) Int. Cl.
*E04F 21/18* (2006.01)
*G01B 5/06* (2006.01)
*G01B 3/00* (2006.01)
*G01B 3/04* (2006.01)

(52) U.S. Cl.
CPC .......... *E04F 21/1855* (2013.01); *G01B 3/004* (2013.01); *G01B 3/04* (2013.01); *G01B 5/061* (2013.01)

(58) Field of Classification Search
CPC ...... E04F 21/1855; E04D 15/025; G01B 3/04
USPC ............................ 33/411, 646, 647, 648, 649
See application file for complete search history.

(56) References Cited

U.S. PATENT DOCUMENTS

| | | | | |
|---|---|---|---|---|
| 1,115,202 A | * | 10/1914 | Ingles | E04F 21/1855 33/646 |
| 1,414,556 A | * | 5/1922 | Dresen | E04D 15/025 33/649 |
| 4,089,141 A | * | 5/1978 | Heroux | E04F 21/1855 52/105 |
| 4,879,818 A | * | 11/1989 | Beaulieu | G01B 3/30 33/646 |
| 4,899,459 A | * | 2/1990 | Taggart | E04F 13/0864 33/646 |
| 5,335,423 A | * | 8/1994 | McLaughlin | E04F 21/1855 33/646 |
| 5,465,499 A | | 11/1995 | LaPlante | |
| 5,611,189 A | * | 3/1997 | Fleck | E04F 21/1855 52/702 |
| 5,692,311 A | * | 12/1997 | Paquin | E04D 15/04 33/647 |
| 6,378,223 B1 | * | 4/2002 | Korich | G01B 3/02 33/649 |
| 6,640,512 B1 | * | 11/2003 | Kinnaman | E04G 21/167 52/489.1 |
| 6,915,590 B2 | * | 7/2005 | Chillington | E04D 15/025 33/648 |

(Continued)

FOREIGN PATENT DOCUMENTS

WO    WO2001061272    8/2001

*Primary Examiner* — Christopher W Fulton

(57) ABSTRACT

A hardboard installation support apparatus for mounting hardboard for board and batten siding installations includes a support bracket having a bracket front side, a bracket back side, a bracket top edge, a bracket bottom edge, a bracket left edge, and a bracket right edge. The supper bracket has a pair of mounting apertures extending from the bracket front side through the bracket back side. The pair of mounting apertures receives hardware to engage a building. A measurement indicator is coupled to the bracket front side and indicates a vertical distance from the bracket bottom edge. A support lip is coupled to the support bracket. The support lip is coupled to the bracket bottom edge and extends away from the bracket front side. The support lip and the bracket front side form an angle between 90° and 100°.

13 Claims, 3 Drawing Sheets

(56) References Cited

U.S. PATENT DOCUMENTS

| | | | |
|---|---|---|---|
| 6,932,310 B1 | 8/2005 | Diss | |
| D525,492 S | 7/2006 | Peterson | |
| 7,434,329 B2 * | 10/2008 | Walda | E04F 21/1855 |
| | | | 33/649 |
| 7,448,507 B1 | 11/2008 | Abernathy, Jr. | |
| 7,543,422 B2 * | 6/2009 | Tomczak | E04F 21/1855 |
| | | | 33/648 |
| 7,546,692 B2 * | 6/2009 | Simko | E04F 21/1855 |
| | | | 33/613 |
| 7,584,587 B2 | 9/2009 | Ouellette | |
| 7,694,429 B2 * | 4/2010 | Duquette | E04F 21/1855 |
| | | | 33/647 |
| 8,272,183 B2 * | 9/2012 | Dodge | E04D 15/04 |
| | | | 52/506.05 |
| 8,656,603 B1 * | 2/2014 | Rush | E04F 21/1855 |
| | | | 33/647 |
| 10,900,221 B2 * | 1/2021 | McEndree | E04F 13/0864 |
| 2001/0034952 A1 * | 11/2001 | Mansfield | E04F 21/1855 |
| | | | 33/647 |
| 2002/0023366 A1 | 2/2002 | Bueno | |
| 2004/0237443 A1 * | 12/2004 | Haley | E04F 13/0823 |
| | | | 52/545 |
| 2007/0256385 A1 | 11/2007 | Walda | |
| 2008/0301966 A1 * | 12/2008 | Walther | E04F 21/1855 |
| | | | 33/649 |
| 2013/0047550 A1 * | 2/2013 | Duquette | E04F 21/1855 |
| | | | 52/749.1 |

* cited by examiner

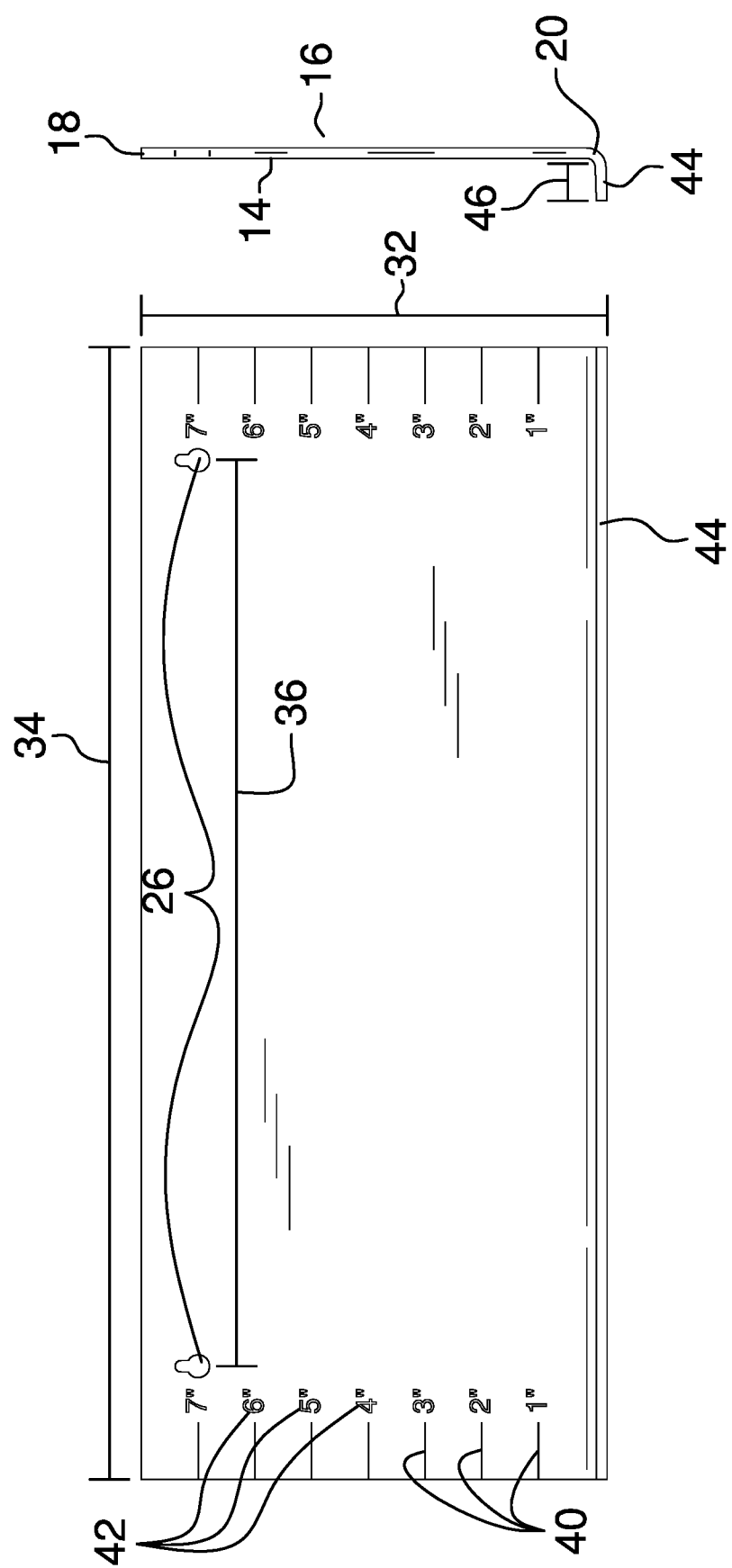

HARDBOARD INSTALLATION SUPPORT APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to siding installation tools and more particularly pertains to a new siding installation tool for mounting hardboard for board and batten siding installations.

(2) Description of Related Art Including Information Disclosed Under 37 CFR 1.97 and 1.98

The prior art relates to siding installation tools. Existing devices function for various types of installation but are not specifically to assist in supporting hardboard during board and batten installation. Existing devices often require a number of components leading to complex functionality or disposition to breaking. Other devices are small and only support a single side of the board rather than maintaining a full sheet in a level position.

BRIEF SUMMARY OF THE INVENTION

An embodiment of the disclosure meets the needs presented above by generally comprising a support bracket having a bracket front side, a bracket back side, a bracket top edge, a bracket bottom edge, a bracket left edge, and a bracket right edge. The support bracket has a pair of mounting apertures extending from the bracket front side through the bracket back side. The pair of mounting apertures is configured to receive hardware to engage a building. A measurement indicator is coupled to the support bracket. The measurement indicator is coupled to the bracket front side and indicates a vertical distance from the bracket bottom edge. A support lip is coupled to the support bracket. The support lip is coupled to the bracket bottom edge and extends away from the bracket front side. The support lip and the bracket front side form an angle between 90° and 100°.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 2 is a front elevation view of an embodiment of the disclosure.

FIG. 3 is a side elevation view of an embodiment of the disclosure.

DETAILED DESCRIPTION OF THE INVENTION

Figure 1:
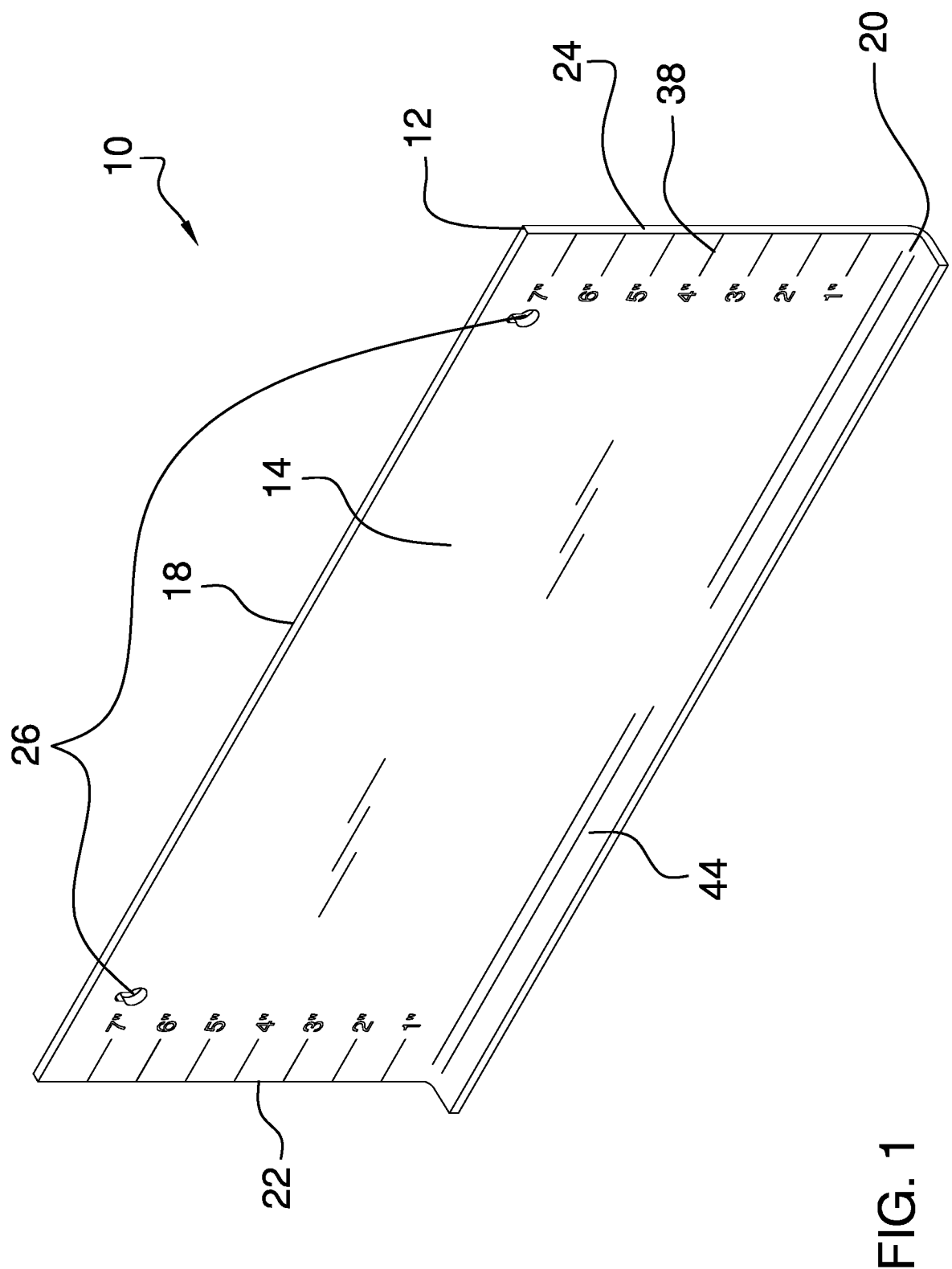
FIG. 1 is an isometric view of a hardboard installation support apparatus according to an embodiment of the disclosure.
Figure 4:
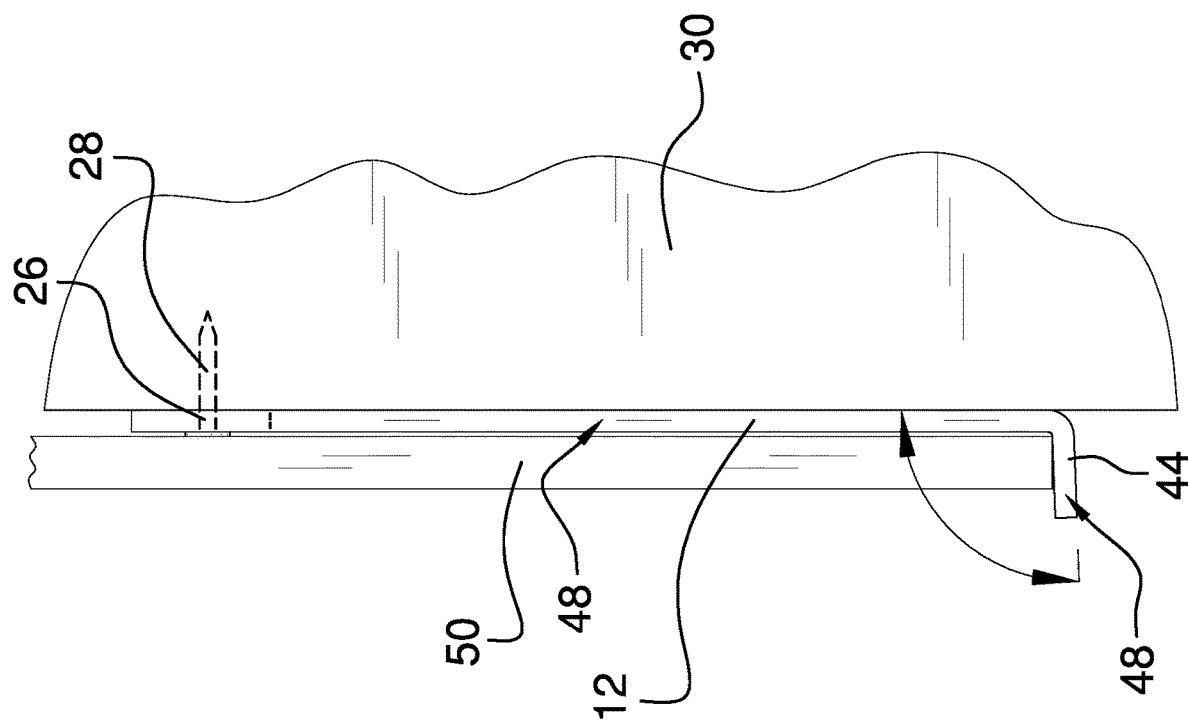
FIG. 4 is an in-use view of an embodiment of the disclosure.

With reference now to the drawings, and in particular to FIGS. 1 through 4 thereof, a new siding installation tool embodying the principles and concepts of an embodiment of the disclosure and generally designated by the reference numeral 10 will be described.

As best illustrated in FIGS. 1 through 4, the hardboard installation support apparatus 10 generally comprises a support bracket 12 having a bracket front side 14, a bracket back side 16, a bracket top edge 18, a bracket bottom edge 20, a bracket left edge 22, and a bracket right edge 24. The support bracket 12 has a pair of mounting apertures 26 extending from the bracket front side 14 through the bracket back side 16. Each mounting aperture 26 of the pair of mounting apertures may be keyhole-shaped. The pair of mounting apertures 26 is configured to receive hardware 28 to engage a building 30. The support bracket 12 may have a bracket height 32 equal to 40% of a bracket width 34. The pair of mounting apertures 26 may be spaced apart a mount distance 36 equal to 80% of the bracket width 34.

A measurement indicator 38 is coupled to the support bracket 12. The measurement indicator 38 is coupled to the bracket front side 14 and indicates a vertical distance from the bracket bottom edge 20. The measurement indicator 38 may comprise a plurality of horizontal hashmarks 40 extending from the bracket left edge 22 and the bracket right edge 24. Each horizontal hashmark 40 is spaced one inch from the adjacent horizontal hashmark 40. Each horizontal hashmark 40 may have a numerical height indicator 42.

A support lip 44 is coupled to the support bracket 12. The support lip 44 is coupled to the bracket bottom edge 20 and extends away from the bracket front side 14. The support lip 44 and the bracket front side 14 form an angle between 90° and 100°. The support lip 44 and the bracket front side 14 may form an angle of exactly 92°. A lip length 46 of the support lip may be equal to 12.5% of the bracket height 32 of the support bracket.

The support bracket 12 and the support lip 44 may each have a thickness 48 of ³⁄₁₆". The bracket height 32 is ideally 8" and the bracket width 34 is ideally 20". The lip length 46 is thus ideally 1".

In use, the placement of a piece of hardboard 50 is identified and a line is marked seven inches above. Hardware 28 such as a 1½" roofing nail is engaged with the building 30 the mount distance 36 apart. The pair of mounting apertures 26 are then engaged with the hardware 28 to support the apparatus 10. The hardboard 50 is placed on the support lip 44 to hold it in a level position while it is engaged with the building 30. It is then angled off the building 30 to remove the apparatus 10 and hardware 28.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A hardboard installation support apparatus comprising:
a support bracket, the support bracket having a bracket front side, a bracket back side, a bracket top edge, a bracket bottom edge, a bracket left edge, and a bracket right edge, the support bracket having a pair of mounting apertures extending from the bracket front side through the bracket back side, the pair of mounting apertures being configured to receive hardware to engage a building;
a measurement indicator coupled to the support bracket, the measurement indicator being coupled to the bracket front side and indicating a vertical distance from the bracket bottom edge; and
a support lip coupled to the support bracket, the support lip being planar having a straight free edge opposite said support bracket, said straight free edge being parallel to said bracket bottom edge, the support lip being coupled to the bracket bottom edge and extending away from the bracket front side, the support lip and the bracket front side forming an angle between 90° and 100°.

2. The hardboard installation support apparatus of claim 1 further comprising the support lip and the bracket front side forming an angle of 92°.

3. The hardboard installation support apparatus of claim 1 further comprising the support bracket having a bracket height being equal to 40% of a bracket width.

4. The hardboard installation support apparatus of claim 1 further comprising a lip length of the support lip being equal to 12.5% of a bracket height of the support bracket.

5. The hardboard installation support apparatus of claim 1 further comprising the measurement indicator comprising a plurality of horizontal hashmarks extending from the bracket left edge and the bracket right edge, each horizontal hashmark being spaced one inch from the adjacent horizontal hashmark.

6. The hardboard installation support apparatus of claim 1 further comprising each horizontal hashmark having a numerical height indicator.

7. The hardboard installation support apparatus of claim 1 further comprising each mounting aperture of the pair of mounting apertures being keyhole-shaped.

8. The hardboard installation support apparatus of claim 1 further comprising the pair of mounting apertures being spaced apart a mount distance equal to 80% of a bracket width of the support bracket.

9. A hardboard installation support apparatus comprising:
a support bracket, the support bracket having a bracket front side, a bracket back side, a bracket top edge; a bracket bottom edge, a bracket left edge, and a bracket right edge, the support bracket having a pair of mounting apertures extending from the bracket front side through the bracket back side, each mounting aperture of the pair of mounting apertures being keyhole-shaped, the pair of mounting apertures being configured to receive hardware to engage a building;
a measurement indicator coupled to the support bracket, the measurement indicator being coupled to the bracket front side and indicating a vertical distance from the bracket bottom edge, the measurement indicator comprising a plurality of horizontal hashmarks extending from the bracket left edge and the bracket right edge, each horizontal hashmark being spaced one inch from the adjacent horizontal hashmark, each horizontal hashmark having a numerical height indicator; and
a support lip coupled to the support bracket, the support lip being planar having a straight free edge opposite said support bracket, said straight free edge being parallel to said bracket bottom edge, the support lip being coupled to the bracket bottom edge and extending away from the bracket front side, the support lip and the bracket front side forming an angle between 90° and 100°.

10. The hardboard installation support apparatus of claim 9 further comprising the support lip and the bracket front side forming an angle of 92°.

11. The hardboard installation support apparatus of claim 9 further comprising the support bracket having a bracket height being equal to 40% of a bracket width.

12. The hardboard installation support apparatus of claim 9 further comprising a lip length of the support lip being equal to 12.5% of a bracket height of the support bracket.

13. The hardboard installation support apparatus of claim 9 further comprising the pair of mounting apertures being spaced apart a mount distance equal to 80% of a bracket width of the support bracket.

* * * * *